United States Patent
Choi et al.

(10) Patent No.: US 6,822,718 B2
(45) Date of Patent: Nov. 23, 2004

(54) LIQUID CRYSTAL DISPLAY

(75) Inventors: Seung Kyu Choi, Daegu (KR); June Ho Park, Kumi-shi (KR); Sang Moo Song, Daegu (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/316,890

(22) Filed: Dec. 12, 2002

(65) Prior Publication Data

US 2003/0197815 A1 Oct. 23, 2003

(30) Foreign Application Priority Data

Apr. 20, 2002 (KR) ........................................ P2002-21791

(51) Int. Cl.[7] ........................................... G02F 1/1343
(52) U.S. Cl. ......................................... 349/143; 349/43
(58) Field of Search ....................... 345/92, 96; 349/43, 349/143, 153

(56) References Cited

U.S. PATENT DOCUMENTS 6,160,535 A * 12/2000 Park ............................ 345/88

* cited by examiner

*Primary Examiner*—James A. Dudek
(74) *Attorney, Agent, or Firm*—McKenna Long & Aldridge LLP (57) ABSTRACT

A liquid crystal display having a liquid crystal display panel driven according a dot inversion method using a data driver driven according to a column inversion method includes dummy liquid crystal cells formed in first and last ones of successive columns in the liquid crystal display panel.

10 Claims, 11 Drawing Sheets

| + | + | + | + | + | + | + | + |
|---|---|---|---|---|---|---|---|
| − | − | − | − | − | − | − | − |
| + | + | + | + | + | + | + | + |
| − | − | − | − | − | − | − | − |
| + | + | + | + | + | + | + | + |
| − | − | − | − | − | − | − | − |
| + | + | + | + | + | + | + | + |
| − | − | − | − | − | − | − | − |

FIG.2B
RELATED ART

| − | − | − | − | − | − | − | − |
|---|---|---|---|---|---|---|---|
| + | + | + | + | + | + | + | + |
| − | − | − | − | − | − | − | − |
| + | + | + | + | + | + | + | + |
| − | − | − | − | − | − | − | − |
| + | + | + | + | + | + | + | + |
| − | − | − | − | − | − | − | − |
| + | + | + | + | + | + | + | + |

| + | − | + | − | + | − | + | − |
|---|---|---|---|---|---|---|---|
| − | + | − | + | − | + | − | + |
| + | − | + | − | + | − | + | − |
| − | + | − | + | − | + | − | + |
| + | − | + | − | + | − | + | − |
| − | + | − | + | − | + | − | + |
| + | − | + | − | + | − | + | − |
| − | + | − | + | − | + | − | + |

FIG.4B
RELATED ART

| − | + | − | + | − | + | − | + |
|---|---|---|---|---|---|---|---|
| + | − | + | − | + | − | + | − |
| − | + | − | + | − | + | − | + |
| + | − | + | − | + | − | + | − |
| − | + | − | + | − | + | − | + |
| + | − | + | − | + | − | + | − |
| − | + | − | + | − | + | − | + |
| + | − | + | − | + | − | + | − |

LIQUID CRYSTAL DISPLAY

This application claims the benefit of Korean Patent Application No. 2002-21791 filed on Apr. 20, 2002, which is hereby incorporated by reference for all purposes as if fully set forth herein.

BACKGROUND OF THE INVENTION

1. Field of the Invention

The present invention relates to a liquid crystal display, and more particularly to a liquid crystal display driven according to a dot inversion method using a data driver driven according to a column inversion method, wherein all liquid crystal cells of a liquid crystal display panel express images at a uniform brightness.

2. Description of the Related Art

Generally, liquid crystal displays typically include a liquid crystal display panel having a plurality of liquid crystal cells arranged in a matrix pattern and driving circuit for driving the liquid crystal display panel. To display pictures, liquid crystal displays control light transmittance characteristics of the liquid crystal cells in accordance with inputted video signals.

The liquid crystal cells are located at areas defined by crossings of gate lines and data lines. Each the liquid crystal cell is provided with a common electrode and a pixel electrode with which an electric field may be generated. Each pixel electrode is connected to a corresponding data line via a switching device such as a thin film transistor (TFT). A terminal of a TFT is connected to a gate line such that video signals may be applied to corresponding pixel electrodes. The driving circuit includes a gate driver for driving gate lines, a data driver for driving data lines, and a common voltage generator for driving the common electrode.

The gate driver sequentially scans the gate lines of the liquid crystal display panel, supplies gate signals to gate lines, and drives the liquid crystal cells on the liquid crystal display panel one gate line at a time. Whenever a gate signal is supplied to a gate line, the data driver supplies suitable video signals to each of data lines crossing that scanned gate line while the common voltage generator supplies common voltage signals to the common electrode. Depending on the video signal applied to the data line, an orientation of molecules of liquid crystal material provided within the liquid crystal cell, between the pixel and common electrodes, may be altered and the light transmittance of the liquid crystal cell may be controlled. Accordingly, as the light transmittances of each of the liquid crystal cells in the liquid crystal display panel are individually controlled, the liquid crystal display panel may display a picture.

Figure 1:
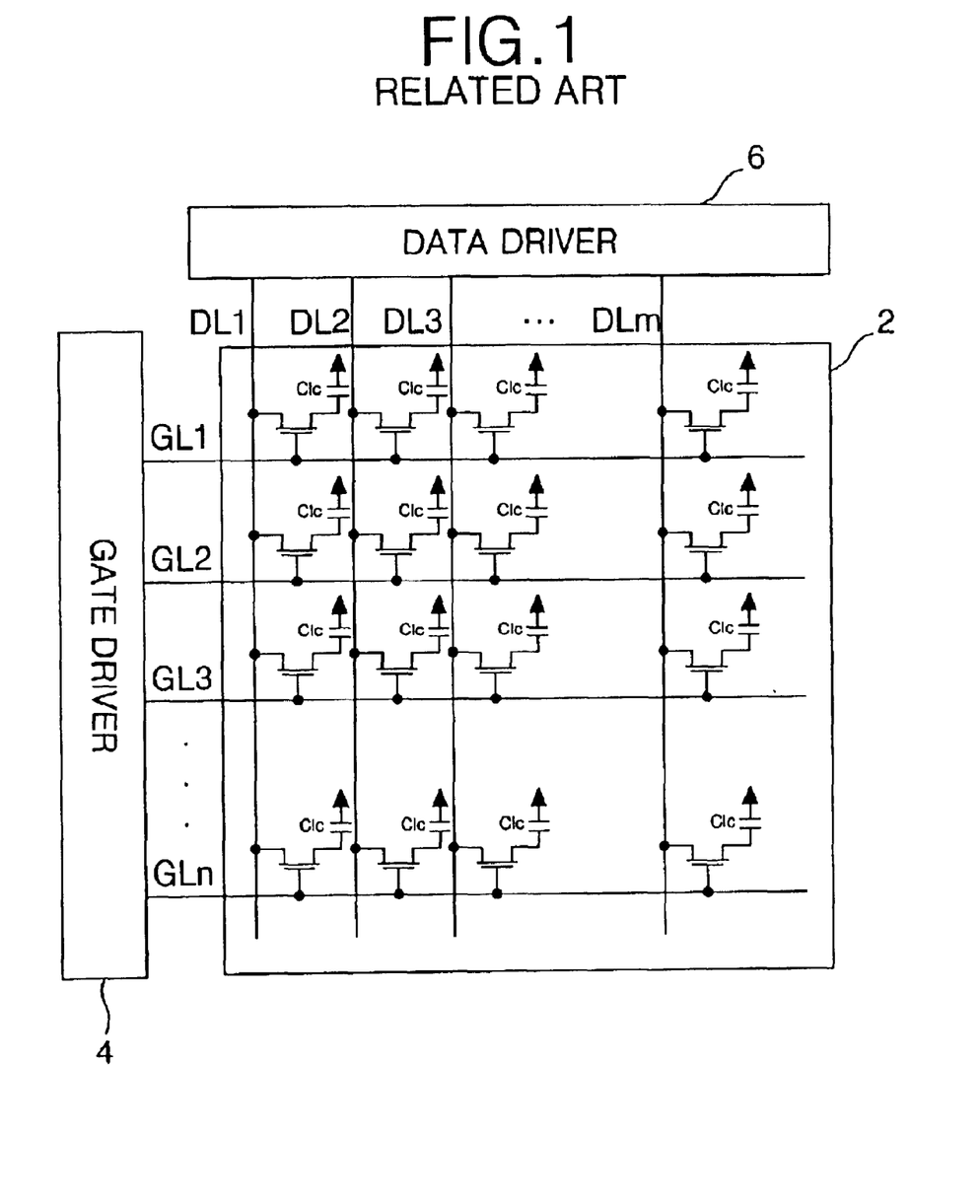
FIG. 1 illustrates a schematic view of a related art liquid crystal display.

FIG. 1 illustrates a schematic view of a related art liquid crystal display.

Referring to FIG. 1, liquid crystal displays typically include a liquid crystal display panel 2 having a plurality of liquid crystal cells arranged in a matrix pattern, a gate driver 4 for driving gate lines GL1 to GLn arranged in the liquid crystal display panel 2, and a data driver 6 for driving data lines DL1 to DLm also arranged in the liquid crystal display panel 2.

Each of the liquid crystal cells include a TFT that responds to gate signals applied to the gate lines GL1 to GLn by supplying video signals, applied to the data lines DL1 to DLm, to the liquid crystal cells. Each liquid crystal cell can be represented as a pixel electrode and a common electrode connected to each other via a TFT and a liquid crystal capacitor Clc. A storage capacitor (not shown), for maintaining a voltage of the video signal, is included within the liquid crystal cell. The storage capacitor maintains the charge within liquid crystal capacitor Clc until the next video signal is supplied.

Storage capacitors of liquid crystal cells are formed between preceding gate electrodes and pixel electrodes of each liquid crystal cell. The gate driver 4 sequentially applies gate signals to gate lines GL1 to GLn to drive the corresponding TFTs. The data driver 6 converts inputted video data into analog video signals and supplies analog video signals, specific to the scanned gate line, to the data lines DL1 to DLm during the period when the gate signal is supplied to the scanned gate line. Additionally, the data driver 6 converts inputted video data into analog video signals using gamma voltages supplied from a gamma voltage generator (not shown).

Liquid crystal cells within liquid crystal display panels such as those illustrated in FIG. 1 may be driven according to various inversion methods including frame, line, column, and dot inversion methods.

When driven according to the frame inversion method, the polarity of video signals supplied to the liquid crystal cells is inverted every frame.

Figure 2A:
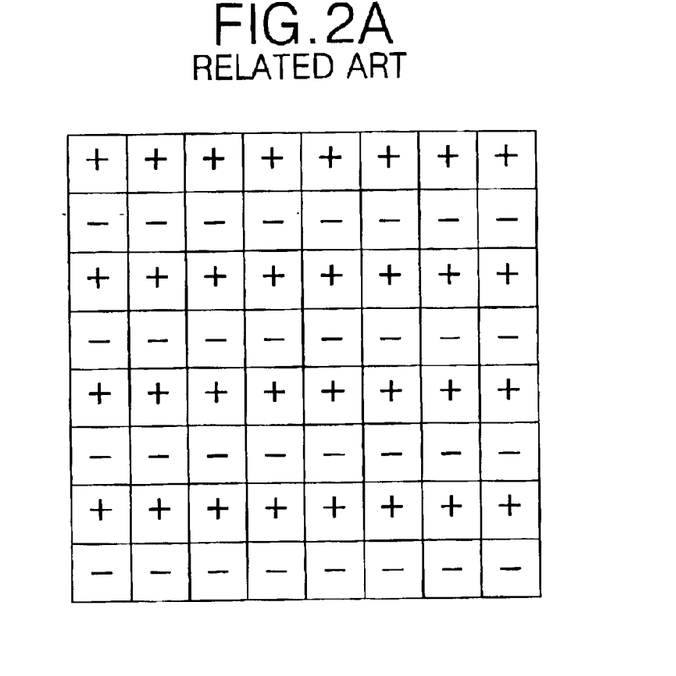
FIGS. 2A and 2B illustrate a line inversion method of driving a liquid crystal display.
Figure 2B:
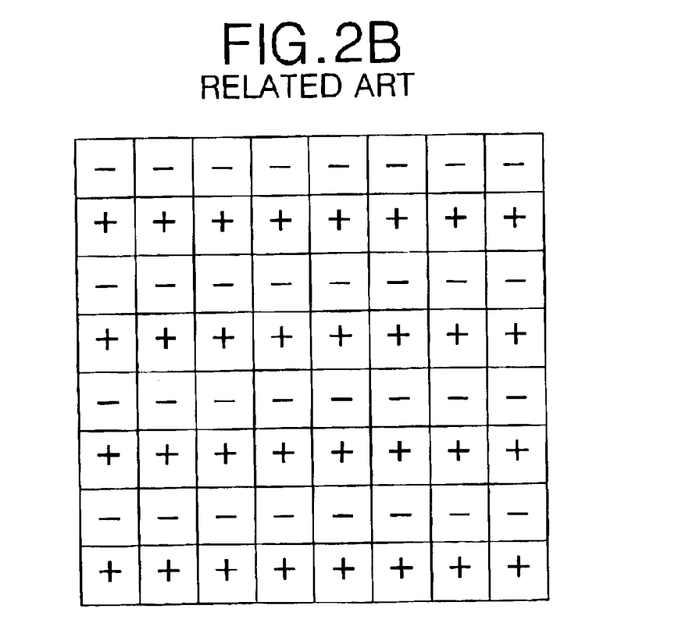

Referring to FIGS. 2A and 2B, when driven according to the line inversion method, the polarity of video signals supplied to liquid crystal cells connected to a gate line is opposite the polarity of video signals supplied to liquid crystal cells connected to gate lines adjacent that gate line. Further, the polarities of the video signals applied to the liquid crystal cells are inverted every frame. Driving liquid crystal cells by the line inversion method, however, is disadvantageous in that a flicker phenomenon is induced in horizontal lines due to electrical cross-talk between liquid crystal cells arranged along the gate lines.

Figure 3A:
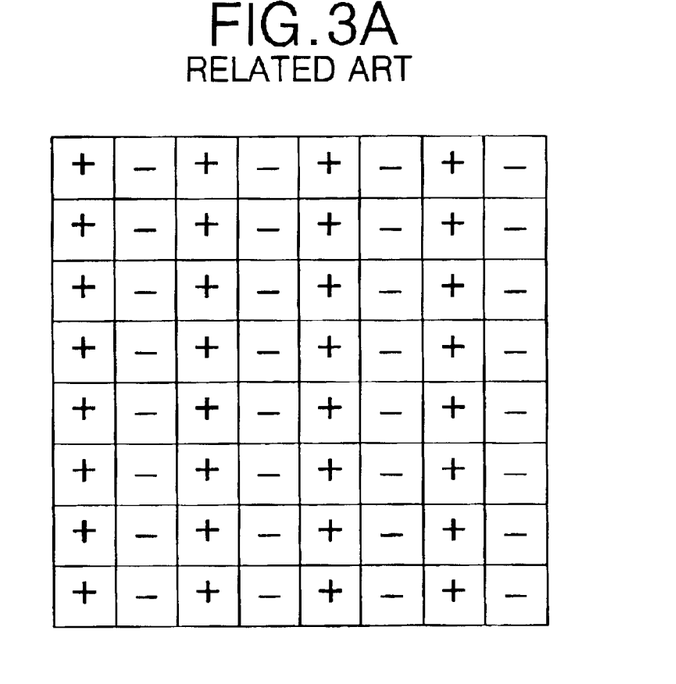
FIGS. 3A and 3B illustrate a column inversion method of driving a liquid crystal display.
Figure 3B:
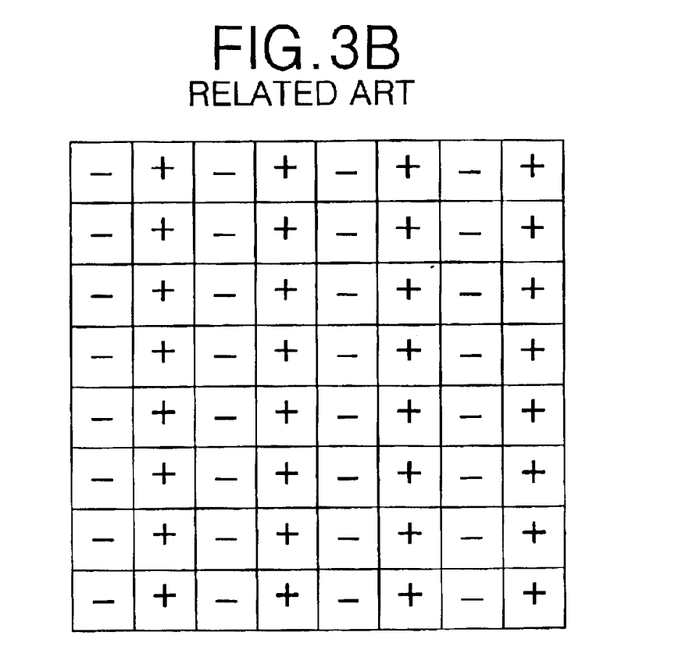

Referring to FIGS. 3A and 3B, when driven according to the column inversion method, the polarity of video signals supplied to liquid crystal cells connected to a data line is opposite the polarity of video signals supplied to liquid crystal cells connected to data lines adjacent that data line. Further, the polarities of the video signals applied to the liquid crystal cells are inverted every frame. Driving liquid crystal cells by the column inversion method, however, is disadvantageous in that a flicker phenomenon is induced in vertical lines due to electrical cross-talk between liquid crystal cells arranged along the data lines.

Figure 4A:
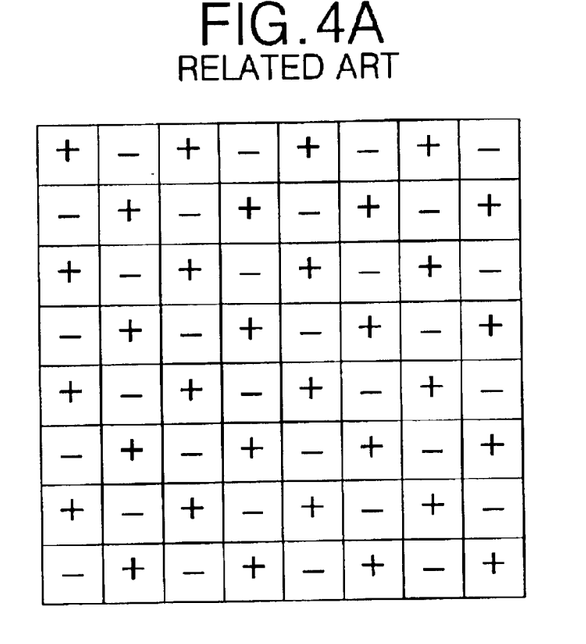
FIGS. 4A and 4B illustrate a dot inversion method of driving a liquid crystal display.
Figure 4B:
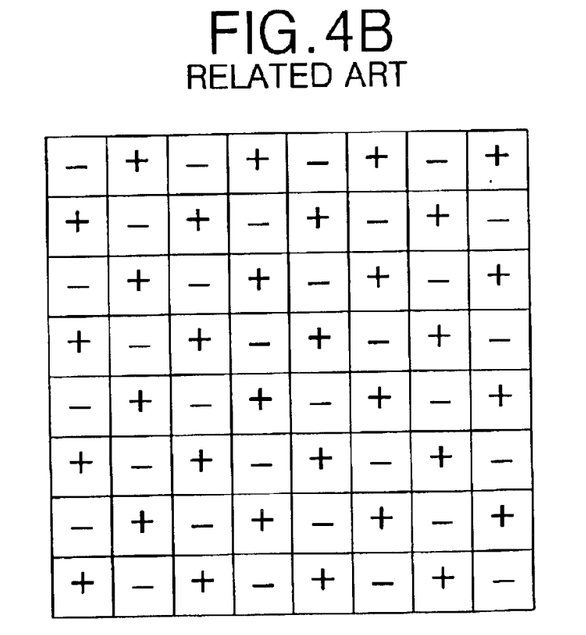

Referring to FIGS. 4A and 4B, when driven according to the dot inversion method, the polarity of a video signal supplied to a liquid crystal cell is opposite the polarity of video signals supplied to adjacent liquid crystal cells (e.g., liquid crystal cells connected to adjacent gate and data lines). Further, the polarities of the video signals applied to the liquid crystal cells are inverted every frame. Driving liquid crystal cells by the dot inversion method offsets any flicker phenomenon that may be induced between vertically or horizontally adjacent liquid crystal cells. Accordingly, pictures generated by the liquid crystal display panel driven using the dot inversion method have superior qualities over pictures generated by liquid crystal display panels driven using other inversion methods.

Use of the dot inversion method, however, is disadvantageous in that the polarity of video signals supplied from the data driver to the data line need to be inverted in horizontal and vertical directions and individual pixel voltages required by the dot inversion method are typically greater than those required by other inversion methods. Accordingly, liquid crystal displays driven using a dot inversion method typically consume a relatively large amount of power during their operation.

SUMMARY OF THE INVENTION

Accordingly, the present invention is directed to liquid crystal display that substantially obviates one or more of the problems due to limitations and disadvantages of the related art.

An advantage of the present invention provides a liquid crystal display driven by a dot inversion method using a data driver driven by a column inversion method, wherein such a liquid crystal display is capable of consuming a relatively small amount of power during its operation.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display including a liquid crystal display panel having liquid crystal cells at crossings of gate and data lines may include liquid crystal cells consecutively arranged within a column alternately connected to data lines adjacent to left and right sides of the liquid crystal cells and a plurality of dummy liquid crystal cells arranged in first and last ones of successive columns of liquid crystal cells.

In one aspect of the present invention, dummy liquid crystal cells may be formed adjacently on the left of the first data line and adjacently on the right of the last data line.

In another aspect of the present invention, among the dummy liquid crystal cells included in the first column, the dummy liquid crystal cells arranged in even numbered horizontal lines may be connected to the first data line, and among the dummy liquid crystal cells included in the last column, the dummy liquid crystal cells arranged in odd numbered horizontal lines may be connected to the last data line.

In yet another aspect of the present invention, among the dummy liquid crystal cells included in the first column, the dummy liquid crystal cells arranged in odd numbered horizontal lines may be connected to the first data line, and among the dummy liquid crystal cells included in the last column, the dummy liquid crystal cells arranged in even numbered horizontal lines may be connected to the last data line.

In still another aspect of the present invention, the dummy liquid crystal cells may be formed to overlap with a black matrix.

According to the principles of another aspect of the present invention, a liquid crystal display panel may include a plurality of dummy liquid crystal cells arranged within first and second columns a liquid crystal cells, a first dummy data line arranged adjacently to the left of the dummy liquid crystal cells to be connected with dummy liquid crystal cells formed within the first column, and a second dummy data line arranged adjacently to the right of the dummy liquid crystal cells to be connected with dummy liquid crystal cells formed within the second column.

In one aspect of the present invention, among the dummy liquid crystal cells within the first column, the dummy liquid crystal cells arranged in odd numbered horizontal lines may be connected to the first dummy data line, and among the dummy liquid crystal cells within the last column the dummy liquid crystal cells arranged in even numbered horizontal lines may be connected to the second dummy data line.

In another aspect of the present invention, among the dummy liquid crystal cells within the first vertical line, the dummy liquid crystal cells arranged in even numbered horizontal lines may be connected to the first dummy data line, and among the dummy liquid crystal cells within the last vertical line the dummy liquid crystal cells arranged in odd numbered horizontal lines may be connected to the second dummy data line.

In yet another aspect of the present invention, the dummy liquid crystal cells may be formed to overlap with a black matrix.

According to the principles of an aspect of the present invention, a liquid crystal display may include a first resistor group coupled to the first of successive data lines, and a second resistor group coupled to the last of successive data lines.

In one aspect of the present invention, a resistance value of first resistors included within the first resistor group and a resistance value of second resistors included within the second resistor group may be substantially equal to the resistance value of a liquid crystal cell.

In another aspect of the present invention, a number of first resistors included within the first resistor group may be substantially half of the number of liquid crystal cells arranged within a column.

In yet another aspect of the present invention, a number of second resistors included within the second resistor group may be substantially half of the number of liquid crystal cells arranged within a column.

In still another aspect of the present invention, the first of successive data lines may be connected to liquid crystal cells arranged in odd numbered horizontal lines and the first resistors may be arranged in every even numbered horizontal line.

In a further aspect of the present invention, the last of successive data lines may be connected to the liquid crystal cells arranged in even numbered horizontal lines and the second resistors may be arranged in every odd numbered horizontal line.

In still a further aspect of the present invention, the first of successive data lines may be connected to liquid crystal cells arranged in even numbered horizontal lines and the first resistors may be arranged in every odd numbered horizontal line.

In yet a further aspect of the present invention, the last of successive data lines may be connected to liquid crystal cells arranged in odd numbered horizontal lines and the second resistors may be arranged in every even numbered horizontal line.

In an additional aspect of the present invention, the first and the second resistors may be formed by providing the first and last of successive data lines with an increased width.

In another aspect of the present invention, the first and the second resistors may be formed by providing the first and last of successive data lines with an increased thickness.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, example of which is illustrated in the accompanying drawings.

Figure 5:
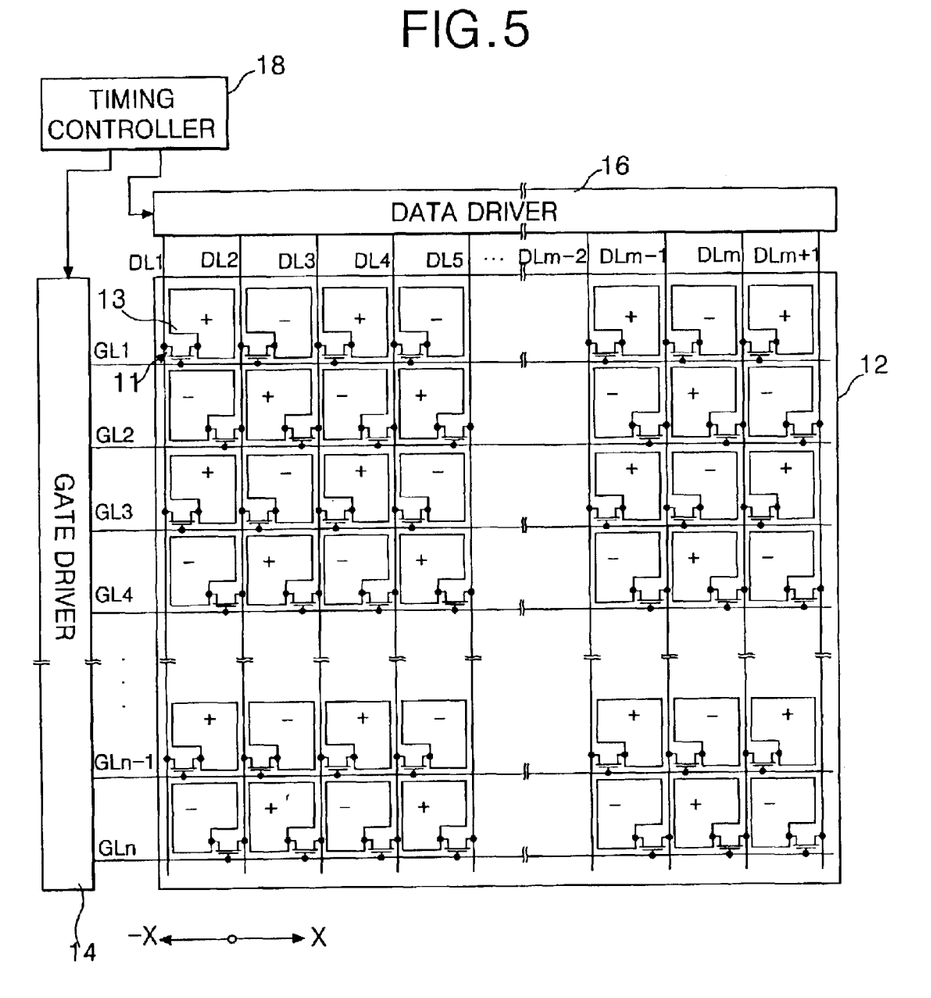
FIG. 5 illustrates a schematic view of a liquid crystal display according to one aspect of the present invention.

FIG. 5 illustrates a schematic view of a liquid crystal display according to an aspect of the present invention.

Referring to FIG. 5, a liquid crystal display may, for example, include a liquid crystal display panel 12 having a plurality of liquid crystal cells arranged in a matrix pattern, a gate driver 14 for driving gate lines GL1 to GLn arranged in the liquid crystal display panel 12, a data driver 16 for driving data lines DL1 to DLm+1 also arranged in the liquid crystal display panel 12, and a timing controller 18 for controlling the gate and data drivers 14 and 16, respectively.

In one aspect of the present invention, a plurality of gate lines GL1 to GLn and a plurality of data lines DL1 to DLm+1 may be insulated from each other where they cross in the liquid crystal display panel 12. The liquid crystal cells, arranged in a matrix pattern, are provided at every crossing of the gate lines GL1 to GLn and the data lines DL1 to DLm+1. Each liquid crystal cell may include a thin film transistor (TFT) 11 connected to one of gate lines GL1 to GLn and a corresponding one of data lines DL1 to DLm+1.

Still referring to FIG. 5, liquid crystal cells consecutively arranged within a column may include TFTs 11 that are alternately connected left and right adjacent data lines DL. For example, liquid crystal cells arranged in odd numbered horizontal lines (e.g., liquid crystal cells including TFTs 11 connected to odd numbered gate lines GL1, GL3, GL5, etc.) may be connected to the first to $m^{th}$ data lines DL1 to DLm arranged in a −X axis direction with respect to a terminal connecting the TFT 11 to the gate line GL. Liquid crystal cells of even numbered horizontal lines (e.g., liquid crystal cells including TFTs 11 connected to even numbered gate lines GL2, GL4, GL6, etc.) may be connected to the second to $(m+1)^{th}$ data lines DL2 to DLm+1 arranged in a +X axis direction with respect to a terminal connecting the TFT 11 to the gate line GL.

The TFTs 11 respond to gate signals applied to gate lines GL1 to GLn by supplying video signals, applied to the data lines DL1 to DLm+1, to the liquid crystal cells. Depending on the video signal applied to the data line, an orientation of liquid crystal molecules (not shown) included within the liquid crystal cell, between a common electrode (not shown) and a pixel electrode 13, may be altered and the light transmittance of the liquid crystal cell may thereby be controlled. Accordingly, as the light transmittances of each of the liquid crystal cells in the liquid crystal display panel are individually controlled, the liquid crystal display panel may display a picture.

The gate driver 14 scans and sequentially applies gate signals to the gate lines GL1 to GLn to drive the corresponding TFTs 11. The data driver 16 converts inputted video data into analog video signals and supplies analog video signals, specific to the scanned gate line, to the data lines DL1 to DLm+1 during the period when the gate signal is supplied to the scanned gate line. Additionally, the data driver 16 may convert inputted video data into analog video signals using gamma voltages supplied from a gamma voltage generator (not shown).

In one aspect of the present invention, the data driver 16 may supply video signals to data lines DL1 to DLm+1 using a column inversion driving method. For example, the data driver 16 may supply video signals having a first polarity to the odd numbered data lines DL1, DL3, etc., and supply video signals having a second polarity, opposite the first polarity, to the even numbered data lines DL2, DL4, etc. In one aspect of the present invention, the data driver 16 may supply video signals to the liquid crystal cells in the liquid crystal display illustrated in FIG. 5 via data lines DL1 to DLm+1 in every horizontal period. Alternatively, the data driver 16 may supply the video signals by shifting them to the right by one channel. Accordingly, the data driver 16 may be driven by a column inversion method and the video signals may be applied directly to the data lines or they may be shifted to the right by one channel before being applied to the data lines, thereby driving the liquid crystal cells of the liquid crystal display by a dot inversion method.

In one aspect of the present invention, the data driver 16 may apply video signals to odd numbered horizontal lines via the first to $m^{th}$ data lines DL1 to DLm. Subsequently, the data driver 16 may apply video signals to even numbered horizontal lines via the second to $(m+1)^{th}$ data lines DL2 to DLm+1 by shifting the previously applied video signals to the right by one channel to each of the data lines.

For example, in a first horizontal period when the first gate line GL1 is driven, video signals having a positive polarity applied from the data driver 16 may be supplied to the odd numbered liquid crystal cells connected to odd numbered data lines DL1, DL3, etc., while video signals having a negative polarity applied from the data driver 16 may supplied to the even numbered liquid crystal cells connected to the even numbered data lines DL2, DL2, etc.

Subsequently, in a second horizontal period when, for example, the second gate line GL2 is driven, the data driver 16 shifts the video signals applied in the first horizontal period to the right by one channel such that video signals having a negative polarity are applied to the odd numbered liquid crystal cells connected to the even numbered data lines DL2, DL4, etc., video signals having a positive polarity may be applied to the even numbered liquid crystal cells connected the odd numbered data lines DL3, DL5, etc., with the exception of the first data line DL1. Accordingly, the data driver 16 may be driven by a column inversion method while liquid crystal cells of the liquid crystal display panel 12 may be driven by a dot inversion method.

As shown in FIG. 5, consecutive liquid crystal cells arranged within a column may be alternately connected to left and right adjacent data lines may be driven using a dot inversion method while the data driver is driven by a column inversion method. Accordingly, the liquid crystal display shown in FIG. 5 may consume a relatively small amount of power during its operation compared to liquid crystal displays using data drivers driven according to dot inversion methods such as those illustrated in FIG. 1.

The brightness to which images may be displayed by liquid crystal cells connected to the first data line DL1 and the last data line DLm+1 of the liquid crystal display shown in FIG. 5, however, is different from a brightness to which images may be displayed by liquid crystal cells connected to the second data line DL2 to the $m^{th}$ data line DLm.

For example, TFTs 11 that are connected to the first data line DL1 are formed at crossings of the first data line DL1 and the odd numbered gate lines GL1, GL3, etc., and, TFTs 11 connected to the last data line DLm+1 are formed at crossings of the last data line DLm+1 and the even numbered gate lines GL2, GL4, etc. TFTs 11 connected to the second to $m^{th}$ data line DL2 to DLm, however, are formed at crossings of the odd and even numbered gate lines GL1 to GLn. Accordingly, the number of the liquid crystal cells connected to the first and last data lines DL1 and DLm+1 is substantially half the number of the liquid crystal cells connected to the second to $m^{th}$ data lines DL2 to DLm. Accordingly, the first and last data lines DL1 and DLm+1 have half the resistive load of the second to $m^{th}$ data lines DL1 to DLm. Since the loads of the first and last data lines DL1 and DLm+1 and the loads of the second to $m^{th}$ data lines DL2 to DLm are different, a delay of video signals supplied through the data lines DL1 to DLm+1 varies. For example, as the video signals supplied to the liquid crystal cells connected to the first and last data lines DL1 and DLm+1 are the same as those supplied to the second to $m^{th}$ data line DL2 to DLm, a problem occurs in that a brightness is not uniformly expressed by the liquid crystal display.

Figure 6:
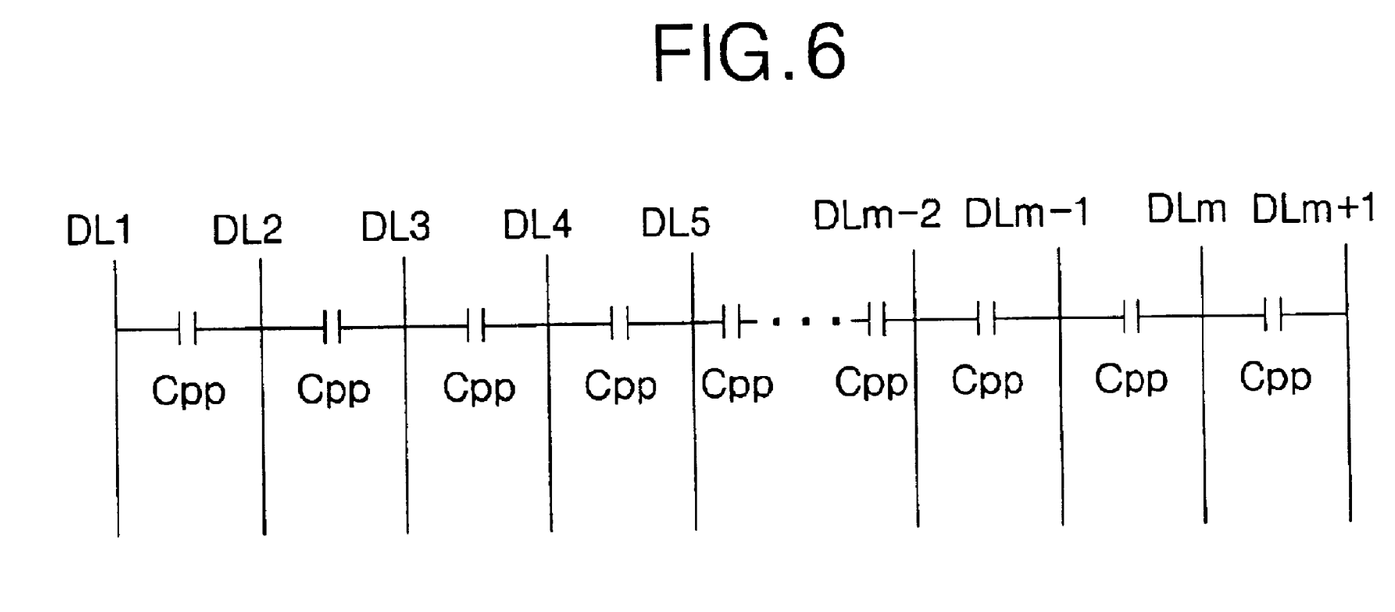
FIG. 6 illustrates a diagram representing an equivalent circuit diagram of parasitic capacitors formed in the liquid crystal display shown in FIG. 5.

Referring to FIG. 6, parasitic capacitors Cpp exist between the data lines DL1 to DLm+1 shown in FIG. 5. For example, two parasitic capacitors Cpp may be connected to the second to the $m^{th}$ data lines DL2 to DLm because liquid crystal cells are arranged at both sides of lines DL2 to DLm. Because liquid crystal cells are arranged only at the right of the first data line DL1, only one parasitic capacitor Cpp is connected to the first data line DL1. Similarly, only one parasitic capacitor Cpp is connected to the left of the last data line DLm+1.

If the number of the parasitic capacitors Cpp are connected to the first and last data line DL1 and DLm+1 are different from the number of the parasitic capacitors connected to the second to the $m^{th}$ data lines DL2 to DLm, the brightness capable of being expressed by liquid crystal cells connected to the first and last data lines DL1 and DLm+1 is different from the brightness capable of being expressed by liquid crystal cells connected to the second to $m^{th}$ data lines DL2 to DLm.

Accordingly, driving conditions of liquid crystal cells are different and proportional to a voltage drop component induced by the parasitic capacitors Cpp. For example, if video signals specific to a single brightness are supplied to all of the data lines DL1 to DLm+1, pictures expressed by liquid crystal cells connected to the first and last data lines DL1 and DLm+1 will be expressed at a higher brightness than pictures expressed by liquid crystal cells connected to the second to $m^{th}$ data lines DL2 to DLm. Even though identical video signals are supplied to all the data lines DL1 to DLm+1, uniform brightness may not be obtained by the liquid crystal display illustrated in FIG. 5.

Figure 7:
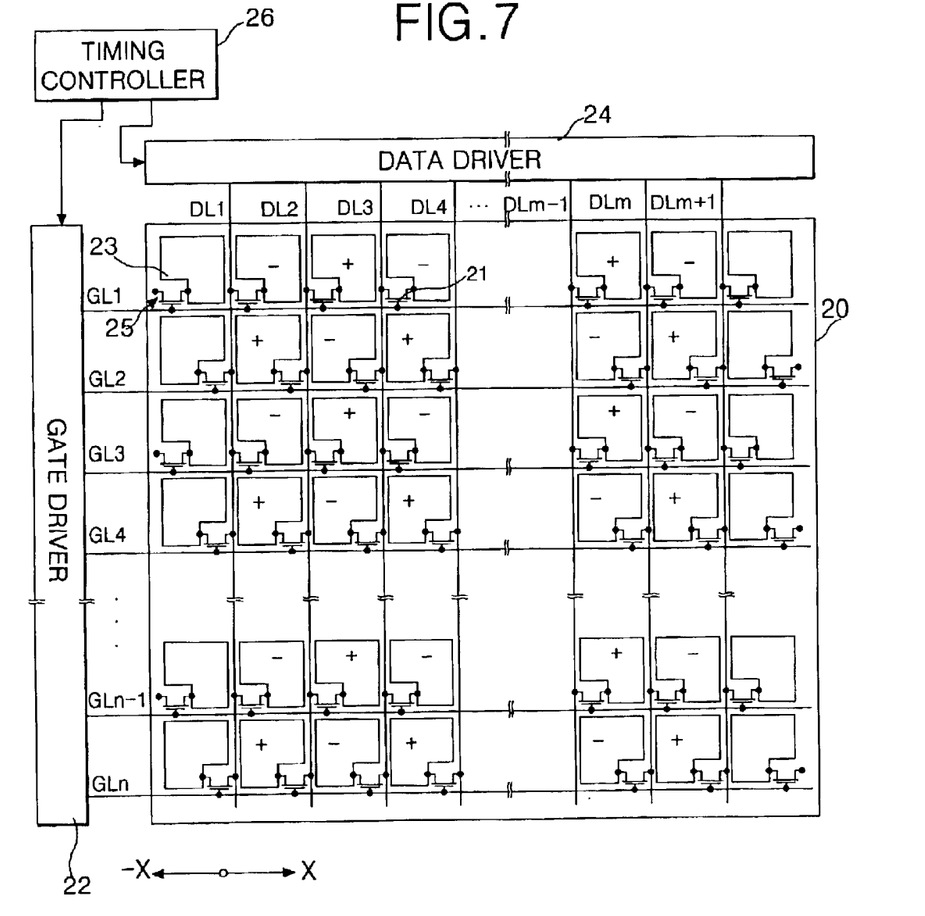
FIG. 7 illustrates a schematic view of a liquid crystal display according to another aspect of the present invention.

FIG. 7 illustrates a schematic view of a liquid crystal display according to another aspect of the present invention.

Referring to FIG. 7, a liquid crystal display may, for example, include a liquid crystal display panel 20 having a plurality of liquid crystal cells arranged in a matrix pattern, a gate driver 22 for driving gate lines GL1 to GLn arranged in the liquid crystal display panel 20, a data driver 24 for driving data lines DL1 to DLm+1 also arranged in the liquid crystal display panel 20, and a timing controller 26 for controlling the gate and data drivers 22 and 24, respectively.

In one aspect of the present invention, a plurality of gate lines GL1 to GLn and a plurality of data lines DL1 to DLm+1 may be insulated from each other where they cross in the liquid crystal display panel 20. The liquid crystal cells, arranged in a matrix pattern, are provided at every crossing of the gate lines GL1 to GLn and data lines DL1 to DLm+1. Each liquid crystal cell may include a first thin film transistor (TFT) 21 connected to one of gate lines GL1 to GLn and a corresponding one of data lines DL1 to DLm+1. In one aspect of the present invention, second thin film transistors (TFT) 25 connected to any of gate lines GL1 to GLn and not connected to the data lines DL1 to DLm+1 may be formed in predetermined liquid crystal cells. Accordingly, the second TFTs 25 may be arranged to the left of the first data line DL1 and to the right of the last data line DLm+1.

Still referring to FIG. 7, first TFTs 21 of liquid crystal cells consecutively arranged within a column may be alternately connected to left or right adjacent data lines DL. Dummy liquid crystal cells may be arranged to the left of the first data line DL1 and to the right of the last data line DLm+1. In one aspect of the present invention, the dummy liquid crystal cells may be arranged to be overlapped by a black matrix (not shown).

In one aspect of the present invention, the first and second TFTs 21 and 25, respectively, may be alternately provided within consecutive dummy liquid crystal cells arranged to the left of the first data line DL1. In another aspect of the present invention, the first and second TFTs 21 and 25, respectively, may alternately be provided within dummy liquid crystal cells arranged to the right of the last data line DLm+1.

The numbers of liquid crystal cells in the liquid crystal display shown in FIG. 7 that are connected to any of the data lines DL1 to DLm+1 are substantially equal. Since the data lines DL1 to DLm+1 each have substantially the same resistive load, all liquid crystal cells of the liquid crystal display panel express images at a substantially uniform brightness.

Figure 8:
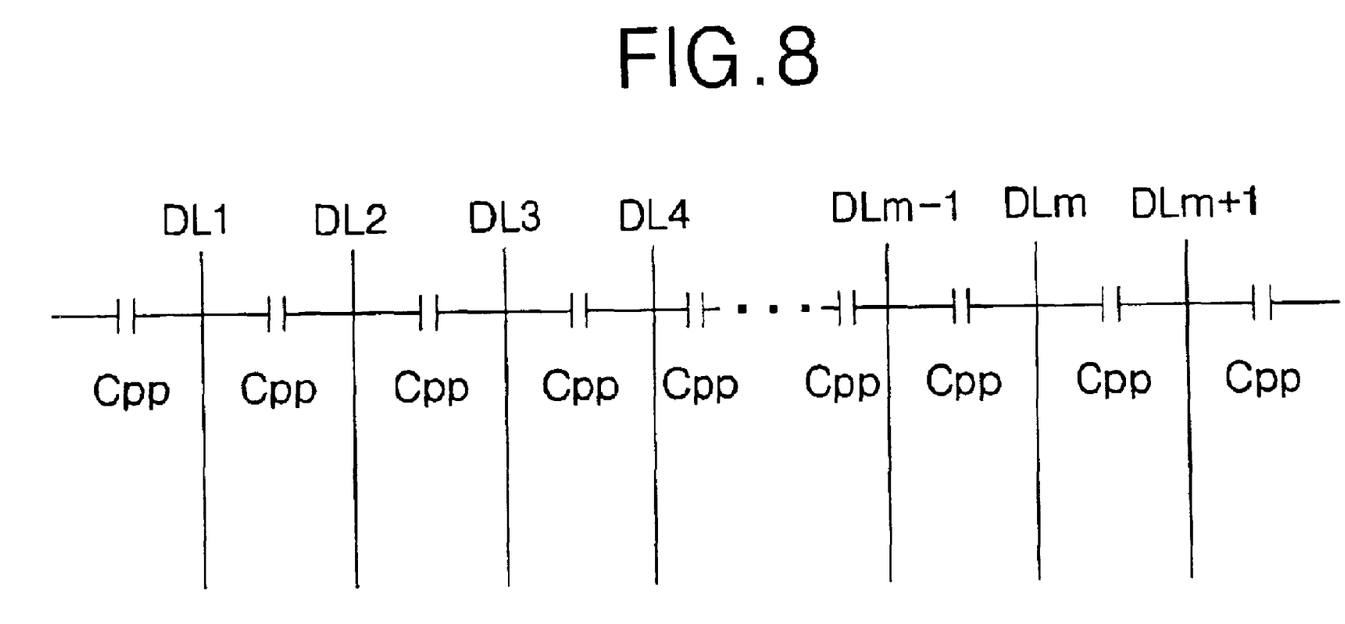
FIG. 8 illustrates a diagram representing an equivalent circuit diagram of parasitic capacitors formed in the liquid crystal display shown in FIG. 7.

Referring to FIG. 8, data lines DL1 to DLm+1 have substantially the same number of the parasitic capacitors Cpp. Due to the presence of dummy liquid crystal cells arranged to the left of the first data line DL1, parasitic capacitors Cpp may be formed adjacent to the left and right of the first data line DL1. Due to the presence of the dummy liquid crystal cells arranged to the right of the last data line DLm+1, parasitic capacitors Cpp may be formed adjacent to the left and right of the last data line DLm+1. Accordingly, parasitic capacitors may be formed adjacent the left and right of all the data lines DL1 to DLm+1 and all liquid crystal cells of the liquid crystal display panel may express images at a substantially uniform brightness when substantially identical video signals are applied to data lines DL1 to DLm+1.

Referring back to FIG. 7, the first TFTs 21 respond to the gate signals applied to gate lines GL1 to GLn by supplying video signals, applied to the data lines DL1 to DLm+1, to the liquid crystal cells. Depending on the video signal applied to the data line, an orientation of liquid crystal molecules (not shown) included within the liquid crystal cell, between a common electrode (not shown) and a pixel electrode 23, may be altered and the light transmittance of the liquid crystal cell may thereby by controlled. Accordingly, as the light transmittances of each of the liquid crystal cells in the liquid crystal display panel are individually controlled, the liquid crystal display panel may display a picture.

The gate driver 22 scans and sequentially applies gate signals to the gate lines GL1 to GLn to drive the corresponding first TFTs 21. The data driver 24 converts inputted video data into analog video signals and supplies analog video signals, specific to the scanned gate line, to the data lines DL1 to DLm+1 during the period when the gate signal is supplied to the scanned gate line. Additionally, the data driver 24 may convert the inputted video data into analog video signals using gamma voltages supplied from a gamma voltage generator (not shown).

In one aspect of the present invention, the data driver 24 may supply video signals to the data lines DL1 to DLm+1 using a column inversion driving method. For example, the data driver 24 may supply video signals having a first polarity to the odd numbered data lines DL1, DL3, etc., and supply video signals having a second polarity, opposite the first polarity, to the even numbered data lines DL2, DL4, etc. In one aspect of the present invention, the data driver 24 may supply video signals to the liquid crystal cells in the liquid crystal display illustrated in FIG. 7 via data lines DL1 to DLm+1 in every horizontal period. Alternatively, the data driver 24 may supply the video signals by shifting them to the right by one channel. Accordingly, the data driver 24 may be driven by a column inversion method and the video signals may be applied directly to the data lines or they may be shifted to the right by one channel before being applied to the data lines, thereby driving the liquid crystal cells of the liquid crystal display by a dot inversion method.

The liquid crystal display illustrated in FIG. 7 may be driven according to a dot inversion method using a data driver driven according to a column inversion method. Accordingly, the liquid crystal display illustrated in FIG. 7 may consume a relatively small amount of power during its operation compared to liquid crystal displays using data drivers driven according to dot inversion methods such as those illustrated in FIG. 1. By providing dummy liquid crystal cells at both right and left ends of the liquid crystal display panel 20, all liquid crystal cells of the liquid crystal display panel may express images at a substantially uniform brightness.

Still referring to FIG. 7, liquid crystal cells arranged in odd numbered horizontal lines (e.g., liquid crystal cells including TFTs connected to odd numbered gate lines GL1, GL3, GL5, etc.) may be connected to the second to $(m+1)^{th}$ data lines DL2 to DLm+1 arranged in a −X axis direction with respect to a terminal connecting the TFT to the gate line GL. Liquid crystal cells arranged in even numbered horizontal lines (e.g., liquid crystal cells including TFTs connected to even numbered gate lines GL2, GL4, GL6, etc.) may be connected to the first to $m^{th}$ data lines DL1 to DLm arranged in a +X axis direction with respect to a terminal connecting the TFT to the gate line GL.

In another aspect of the present invention, liquid crystal cells arranged in odd numbered horizontal lines (e.g., liquid crystal cells including TFTs connected to odd numbered gate lines GL1, GL3, GL5, etc.) may be connected to the second to $(m+1)^{th}$ data lines DL2 to DLm+1 arranged in a +X axis direction with respect to a terminal connecting the TFT to the gate line GL. Liquid crystal cells arranged in even numbered horizontal lines (e.g., liquid crystal cells including TFTs connected to even numbered gate lines GL2, GL4, GL6, etc.) may be connected to the first to $m^{th}$ data lines DL1 to DLm arranged in a −X axis direction with respect to a terminal connecting the TFT to the gate line GL.

In one aspect of the present invention, first and second TFTs 21 and 25, respectively, may be alternately provided within consecutive dummy liquid crystal cells provided in the column left of the first data line DL1. First and second TFTs 21 and 25, respectively, may also be alternately provided within dummy liquid crystal cells arranged in the column right of the last data line DLm+1.

Figure 9:
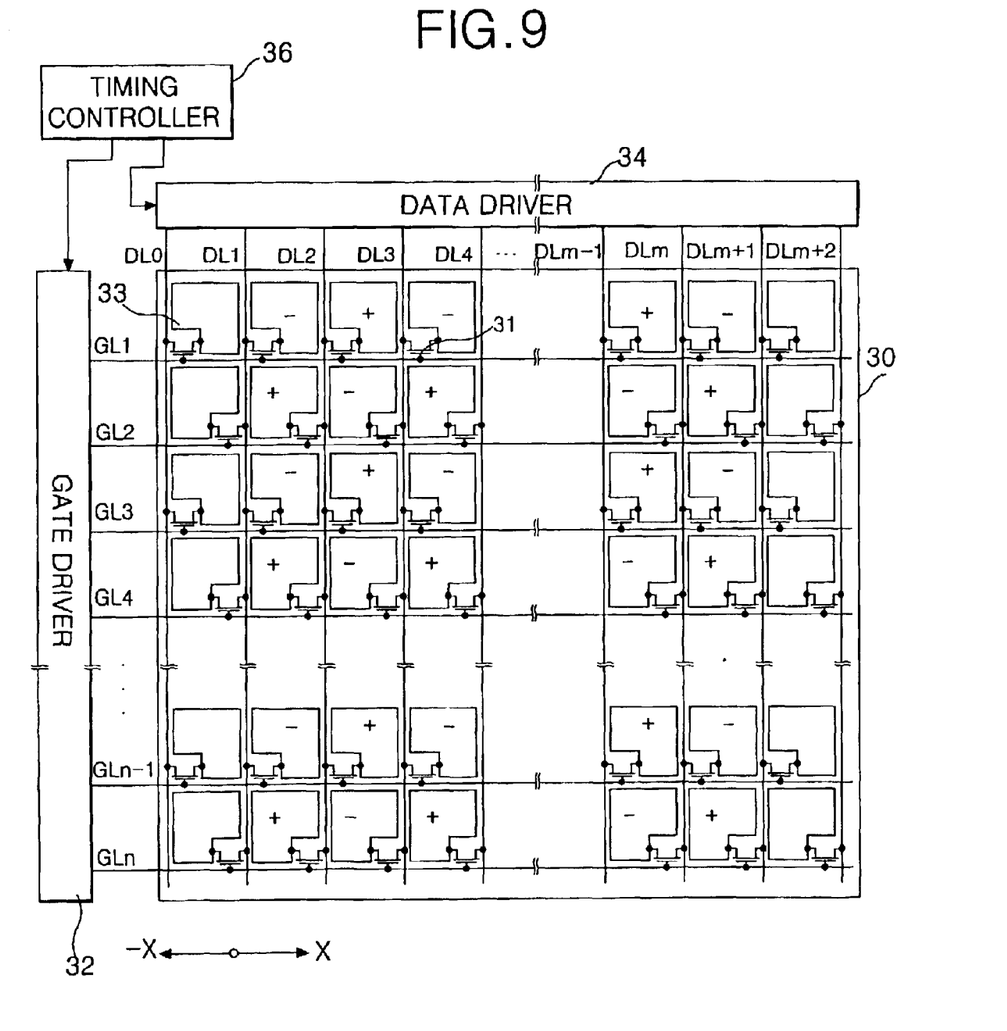
FIG. 9 illustrates a schematic view of a liquid crystal display according to yet another aspect of the present invention.

FIG. 9 illustrates a schematic view of a liquid crystal display according to the yet another aspect of the present invention.

Referring to FIG. 9, a liquid crystal display may, for example, include a liquid crystal display panel 30 having a plurality of liquid crystal cells arranged in a matrix pattern, a gate driver 32 for driving gate lines GL1 to GLn arranged in the liquid crystal display panel 30, a data driver 34 for driving data lines DL0 to DLm+2 also arranged in the liquid crystal display panel 30, and a timing controller 36 for controlling the gate and data drivers 32 and 34, respectively.

In one aspect of the present invention, a plurality of gate lines GL1 to GLn and a plurality of data lines DL0 to DLm+2 may be insulated from each other where they cross in the liquid crystal display panel 30. The liquid crystal cells, arranged in a matrix pattern, are provided at every crossing of the gate lines GL1 to GLn and data lines DL0 to DLm+2. Each liquid crystal cell may include a thin film transistor (TFT) 31 connected to one of gate lines GL1 to GLn and a corresponding one of data lines DL0 to DLm+2.

Still referring to FIG. 9, TFTs 31 of liquid crystal cells within consecutively arranged within a column may be alternately connected to left or right adjacent data lines DL. In one aspect of the present invention, the $0^{th}$ and $(m+2)^{th}$ data lines DL0 and DLm+2, respectively, may be provided as dummy data lines. In another aspect of the present invention, liquid crystal cells formed in the first and last columns may be provided as dummy liquid crystal cells.

According to the principles of the present invention, liquid crystal cells arranged in odd numbered horizontal lines (e.g., liquid crystal cells including TFTs connected to odd numbered gate lines GL1, GL3, GL5, etc.) may be connected to data lines DL arranged in a −X axis direction with respect to a terminal connecting the TFT to the gate line GL. Liquid crystal cells arranged in even numbered horizontal lines (e.g., liquid crystal cells including TFTs connected to even numbered gate lines GL2, GL4, GL6, etc.)

may be connected to the data lines DL arranged in a +X axis direction with respect to a terminal connecting the TFT to the gate line GL.

In another aspect of the present invention, liquid crystal cells arranged in odd numbered horizontal lines (e.g., liquid crystal cells including TFTs connected to the odd numbered gate lines GL1, GL3, GL5, etc.) may be connected to data lines DL arranged in a +X axis direction with respect to a terminal connecting the TFT to the gate line GL. Liquid crystal cells arranged in even numbered horizontal lines (e.g., liquid crystal cells including TFTs connected to even numbered gate lines GL2, GL4, GL6, etc.) may be connected to the data lines DL arranged in a −X axis direction with respect to a terminal connecting the TFT to the gate line GL.

In the liquid crystal display illustrated in FIG. 9, images displayed in the dummy liquid crystal cells via the data driver 34 and the gate driver 32 are different than those displayed in the non-dummy liquid crystal cells and not desirably viewed. Accordingly, in order to prevent images displayed by the dummy liquid crystal cells from being viewed, a black matrix (not shown) may be arranged over the dummy liquid crystal cells.

Video signals related to images that are to be displayed may be supplied to the first to $(m+1)^{th}$ data lines DL1 to DLm+1. Left and right sides of the first to $(m+1)^{th}$ data lines DL1 to DLm+1 may be connected to liquid crystal cells. Accordingly, the first to $(m+1)^{th}$ data lines DL1 to DLm+1 may be provided with the same resistive load and the liquid crystal cells connected to the first to $(m+1)^{th}$ data lines are able to display pictures at a uniform brightness.

Figure 10:
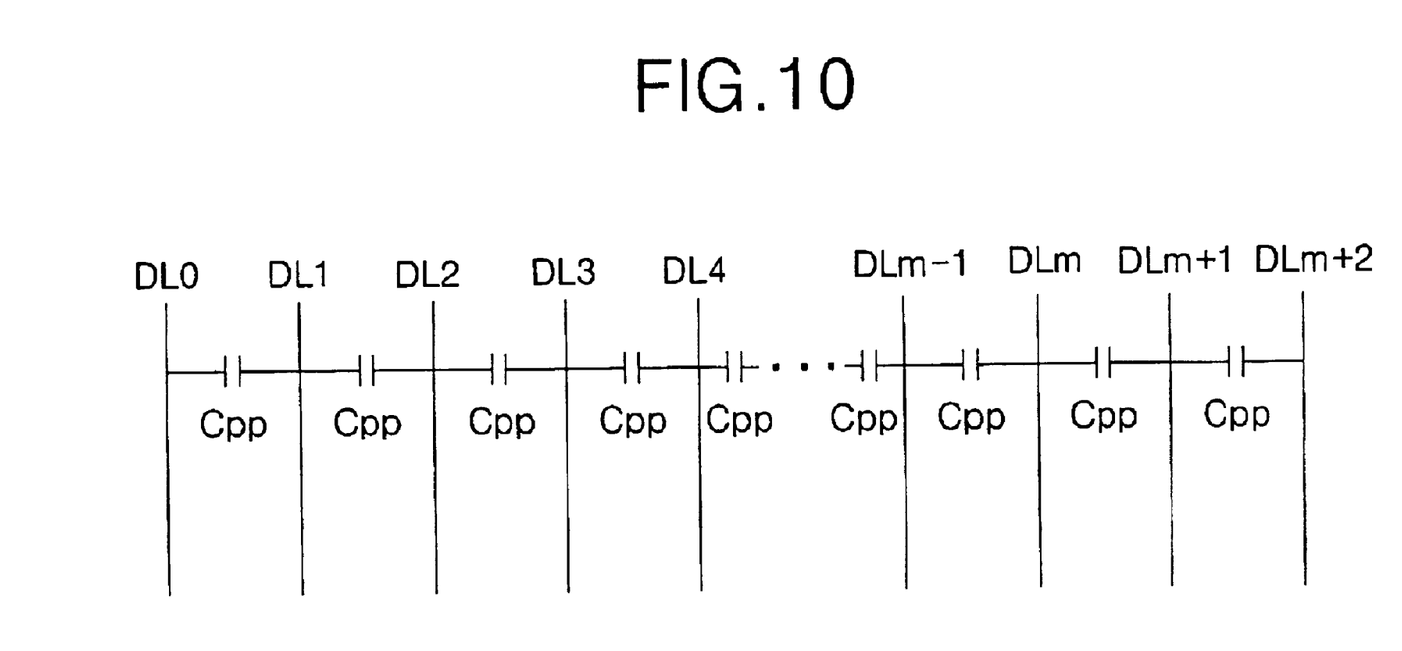
FIG. 10 illustrates a diagram representing an equivalent circuit diagram of parasitic capacitors formed in the liquid crystal display shown in FIG. 9.

Referring now to FIG. 10, data lines DL0 to DLm+2 have substantially the same number of the parasitic capacitors Cpp. Due to the presence of dummy liquid crystal cells arranged to the left of the first data line DL1, parasitic capacitors Cpp may be formed adjacent to the left and right of the first data line DL1. Due to the presence of the dummy liquid crystal cells arranged to the right of the last data line DLm+1, parasitic capacitors Cpp may be formed adjacent on the left and right of the last data line DLm+1.

Since the first to $(m+1)^{th}$ data lines DL1 to DLm+1 are connected to substantially the same number of parasitic capacitors Cpp, images of a substantially uniform brightness may be displayed by the liquid crystal cells connected to the first to $(m+1)^{th}$ data lines DL1 to DLm+1 when in receipt of substantially identical video signals.

Referring back to FIG. 9, the TFTs 31 respond to the gate signals applied from the gate lines GL1 to GLn by supplying video signals, applied to the data lines DL0 to DLm+2, to the liquid crystal cells. Depending on the video signal applied to the data line, an orientation of liquid crystal molecules (not shown) included within the liquid crystal cell, between a common electrode (not shown) and a pixel electrode 33, may be altered and the light transmittance of the liquid crystal cell may thereby by controlled. Accordingly, as the light transmittances of each of the liquid crystal cells in the liquid crystal display panel are individually controlled, the liquid crystal display panel may display a picture.

The gate driver 32 scans and sequentially applies gate signals to the gate lines GL1 to GLn to drive the corresponding TFTs 31. The data driver 34 converts inputted video data into analog video signals and supplies analog video signals, specific to the scanned gate line, to the data lines DL0 to DLm+2 during the when the gate signal is supplied to the scanned gate line. Additionally, the data driver 34 may supply video signals using a column inversion driving method during every horizontal period so that it is possible to drive liquid crystal cells within the liquid crystal display illustrated in FIG. 9 using a dot inversion driving method.

The liquid crystal display illustrated in FIG. 9 may be driven by a dot inversion method using a data driver driven by a column inversion method. Accordingly, the liquid crystal display illustrated in FIG. 9 may consume a relatively small amount of power during its operation compared to liquid crystal displays using data drivers driven according to dot inversion methods such as those illustrated in FIG. 1. By providing dummy liquid crystal cells at both right and left ends of the liquid crystal display panel 30, all liquid crystal cells of the liquid crystal display panel may express images at a substantially uniform brightness.

Figure 11:
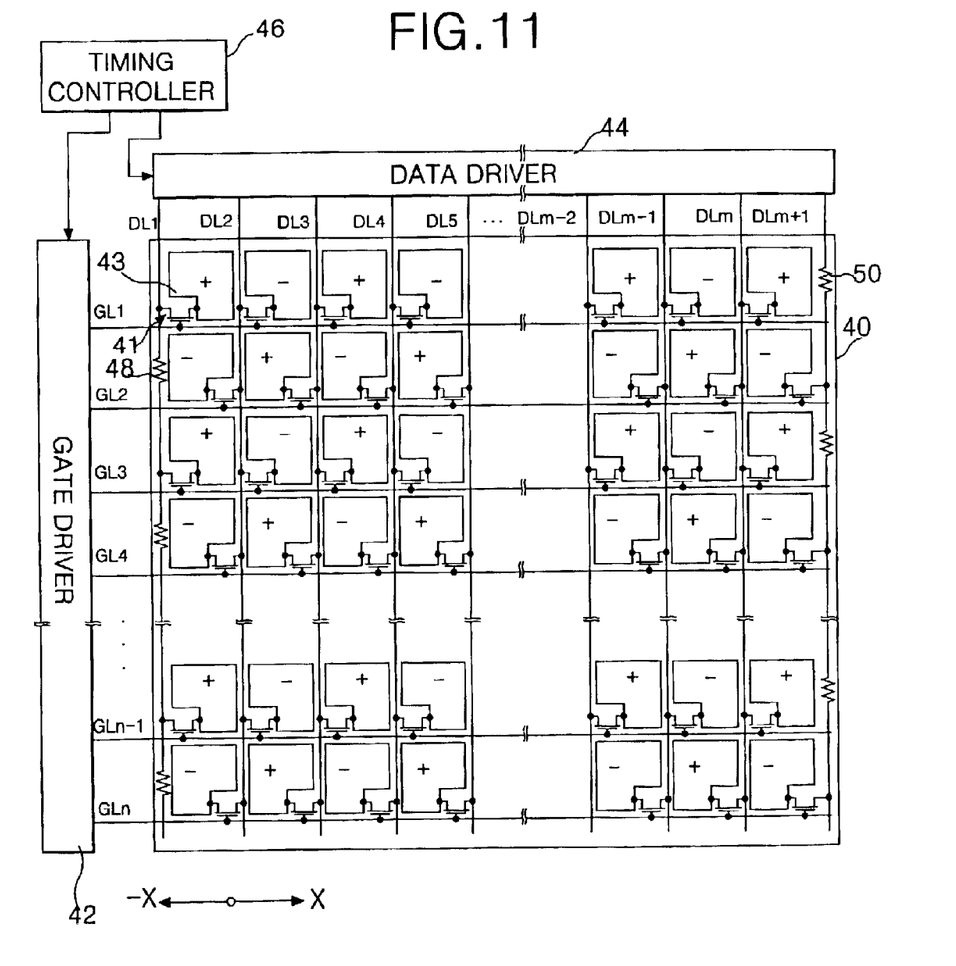
FIG. 11 illustrates a schematic view of a liquid crystal display according to still another aspect of the present invention.

FIG. 11 illustrates a schematic view of a liquid crystal display according to still another aspect of the present invention.

Referring to FIG. 11, a liquid crystal display may, for example, include a liquid crystal display panel 40 having a plurality of liquid crystal cells arranged in a matrix pattern, a gate driver 42 for driving gate lines GL1 to GLn arranged in the liquid crystal display panel 40, a data driver 44 for driving data lines DL1 to DLm+1 also arranged in the liquid crystal display panel 40, and a timing controller 46 for controlling the gate and data drivers 42 and 44, respectively.

In one aspect of the present invention, a plurality of gate lines GL1 to GLn and a plurality of data lines DL1 to DLm+1 may be insulated from each other where they cross in the liquid crystal display panel 40. The liquid crystal cells, arranged in a matrix pattern, are provided at every crossing of the gate lines GL1 to GLn and data lines DL1 to DLm+1. Each liquid crystal cell may include a thin film transistor (TFT) 41 connected to one of gate lines GL1 to GLn and any a corresponding one of data lines DL1 to DLm+1. TFTs 41 of liquid crystal cells within a column may be alternately connected to left or right adjacent data lines DL at every horizontal line.

In one aspect of the present invention, first and second resistors 48 and 50, respectively, may be respectively provided on the first and last data lines DL1 and DLM+1, wherein a resistance value of each of the first and the second resistors 48, 50 is substantially equal to the load of one liquid crystal cell. In another aspect of the present invention, first resistors 48 may be provided within even numbered horizontal lines and second resistors 50 may be provided within odd numbered horizontal lines. In another aspect of the present invention, first resistors 48 may be provided within odd numbered horizontal lines and second resistors 50 may be provided within even numbered horizontal lines. Accordingly, the number of first resistors 48 provided may be substantially half the number of liquid crystal cells within a column and the number of second resistors 50 provided may be substantially half the number of liquid crystal cells within in a column. The first and last data lines DL1 and DLm+1 may have substantially the same resistive load as data lines DL2 to DLm when provided with the first and second resistors 48 and 50, respectively. Accordingly, images having a substantially uniform brightness may be displayed by the liquid crystal cells of the liquid crystal display panel.

In one aspect of the present invention, the first and second resistors 48 and 50, respectively, may be formed in the liquid crystal display panel 40 by controlling a line width and/or a thickness of the first and last data lines DL1 and DLm+1.

In one aspect of the present invention, liquid crystal cells arranged in odd numbered horizontal lines (e.g., liquid crystal cells including TFTs connected to odd numbered gate lines GL1, GL3, GL5, etc.) may be connected to the data lines DL arranged in a −X axis direction with respect to a terminal connecting the TFT to the gate line GL. Liquid crystal cells arranged in even numbered horizontal lines (e.g., liquid crystal cells including TFTs connected to even numbered gate lines GL2, GL4, GL6, etc.) may be connected to data lines DL arranged in a +X axis direction with respect to a terminal connecting the TFT to the gate line GL.

In another aspect of the present invention, liquid crystal cells arranged in odd numbered horizontal lines (e.g., liquid crystal cells including TFTs connected to odd numbered gate lines GL1, GL3, GL5, etc.) may be connected to the data lines DL arranged in a +X axis direction with respect to a terminal connecting the TFT to the gate line GL. Liquid crystal cells arranged in even numbered horizontal lines (e.g., liquid crystal cells including TFTs connected to even numbered gate lines GL2, GL4, GL6, etc.) may be connected to data lines DL arranged in a −X axis direction with respect to a terminal connecting the TFT to the gate line GL.

Referring to still to FIG. 11, TFTs 41 respond to the gate signals applied to gate lines GL1 to GLn by supplying video signals, applied to data lines DL1 to DLm+1, to the liquid crystal cells. Depending on the video signal applied to the data line, an orientation of liquid crystal molecules (not shown) included within the liquid crystal cell, between a common electrode (not shown) and a pixel electrode 43, may be altered and the light transmittance of the liquid crystal cell may thereby be controlled. Accordingly, as the light transmittances of each of the liquid crystal cells in the liquid crystal display panel are individually controlled, the liquid crystal display panel may display a picture.

The gate driver 42 scans and sequentially applies gate signals to the gate lines GL1 to GLn to drive the corresponding TFTs 41. The data driver 44 converts inputted video data into analog video signals and supplies analog video signals specific to the scanned gate line, to the data lines DL1 to DLm+1 during the period when the gate signal is supplied to the scanned gate line. Additionally, the data driver 44 may convert the video data into analog video signals using gamma voltages supplied from a gamma voltage generator (not shown).

In one aspect of the present invention, the data driver 44 may supply video signals to the data lines DL1 to DLm+1 using a column inversion driving method. Accordingly, the liquid crystal display shown in FIG. 11 consume a relatively small amount of power during its operation compared to liquid crystal displays using data drivers driven according to dot inversion methods such as those illustrated in FIG. 1. Further, the resistors added to the first and last data lines allow the liquid crystal cells of the liquid crystal display panel to express images at a substantially uniform brightness.

According to the principles of the present invention, TFTs of liquid crystal cells within a column may be alternately connected to adjacent data lines on the left and right, thereby enabling the liquid crystal display panel to be driven by a dot inversion method while the data driver is driven by a column inversion method. The liquid crystal display panel is capable of operating under a reduced power consumption compared to liquid crystal display panels driven using dot inversion systems such as those illustrated in FIG. 1.

Additionally, dummy liquid crystal cells may be formed at the left or right end of the liquid crystal display panel. Further, resistive components may be added to the first and last data lines. Accordingly, images may be displayed by the liquid crystal cells such that the pictures produced by the liquid crystal display are provided at a uniform brightness.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display, comprising:
   a liquid crystal display panel;
   a plurality of gate lines;
   a plurality of successive data lines crossing the plurality of gate lines;
   a plurality of liquid crystal cells arranged at crossings of the gate and data lines and arranged in successive columns defined by at least one adjacent data line of the plurality of successive data lines, wherein parasitic capacitors are formed between each of the liquid crystal cells and data lines adjacent to the plurality of liquid crystal cells, the plurality of liquid crystal cells including a plurality of dummy liquid crystal cells arranged within a first and last one of successive columns such that each of the plurality of successive data lines is connected to the same number of parasitic capacitors,
   wherein consecutive ones of the plurality of liquid crystal cells within the columns are alternately coupled to the at least one adjacent data line.

2. The liquid crystal display according to claim 1, wherein the plurality of dummy liquid crystal cells are arranged to the left of the first of successive data lines and to the right of the last of successive data lines.

3. The liquid crystal display according to claim 1, wherein
   dummy liquid crystal cells included in the first of successive columns arranged in even numbered horizontal lines are connected to the first of successive data lines; and
   dummy liquid crystal cells included in the last of successive columns arranged in odd numbered horizontal lines are connected to the last of successive data lines.

4. The liquid crystal display according to claim 1, wherein
   dummy liquid crystal cells included in the first of successive columns arranged in odd numbered horizontal lines are connected to the first of successive data lines; and
   dummy liquid crystal cells included in the last of successive columns arranged in even numbered horizontal lines are connected to the last of successive data lines.

5. The liquid crystal display according to claim 1, further comprising a black matrix overlapping the dummy liquid crystal cells.

6. A liquid crystal display, comprising:
   a liquid crystal display panel;
   a plurality of gate lines;
   a plurality successive data lines crossing the plurality of gate lines;
   a plurality of liquid crystal cells arranged at crossings of the gate and data lines and arranged in successive columns defined by at least one adjacent data line of the plurality of successive data lines, the plurality of liquid crystal cells including a plurality of dummy liquid crystal cells arranged within a first and last one of successive columns, wherein consecutive ones of the plurality of liquid crystal cells within the columns are alternately coupled to the at least one adjacent data line, wherein the plurality of successive data lines comprises a first dummy data line coupled to the left of dummy liquid crystal cells arranged within the first of successive columns and a second dummy data line coupled to the right of dummy liquid crystal cells arranged within the last of successive columns.

7. The liquid crystal display according to claim 6, wherein dummy liquid crystal cells included in the first of successive columns arranged in odd numbered horizontal lines are connected to the first dummy data line; and dummy liquid crystal cells included in the last of successive columns arranged in even numbered horizontal lines are connected to the second dummy data line.

8. The liquid crystal display according to claim 6, wherein dummy liquid crystal cells included in the first of successive columns arranged in even numbered horizontal lines are connected to the first dummy data line; and dummy liquid crystal cells included in the last of successive columns arranged in odd numbered horizontal lines are connected to the second dummy data line.

9. The liquid crystal display according to claim 6, further comprising a black matrix overlapping the dummy liquid crystal cells.

10. The liquid crystal display according to claim 1, wherein a portion of the plurality of dummy liquid crystal cells comprise a thin film transistor not connected to the plurality of successive data lines.

* * * * *